United States Patent [19]

Maes

[11] Patent Number: 4,993,575

[45] Date of Patent: Feb. 19, 1991

[54] QUICK CLOSURE BOX

[75] Inventor: Fabrice Maes, Ermont, France

[73] Assignee: Telemecanique, France

[21] Appl. No.: 536,915

[22] Filed: Jun. 12, 1990

[30] Foreign Application Priority Data

Jun. 13, 1989 [FR] France .................................. 89 07771

[51] Int. Cl.⁵ ............................................. H02G 3/00
[52] U.S. Cl. ...................................... 220/3.8; 220/327;
174/50; 411/417
[58] Field of Search .................. 220/3.2, 3.8, 327, 784;
170/50; 411/383, 417

[56] References Cited

U.S. PATENT DOCUMENTS

| | | | |
|---|---|---|---|
| 4,579,248 | 4/1986 | Gorges | 220/327 |
| 4,632,269 | 12/1986 | Rose | 220/327 X |
| 4,664,281 | 5/1987 | Falk et al. | 174/50 X |
| 4,900,210 | 2/1990 | Buchanan et al. | 411/417 X |

Primary Examiner—Steven M. Pollard
Attorney, Agent, or Firm—William A. Drucker

[57] ABSTRACT

A quick closure box is disclosed, in which the lid is fixed to the base by means of a small pitch screw engaged in an extension having a large pitch thread for engagement in a hole comprising thread portions.

5 Claims, 4 Drawing Sheets

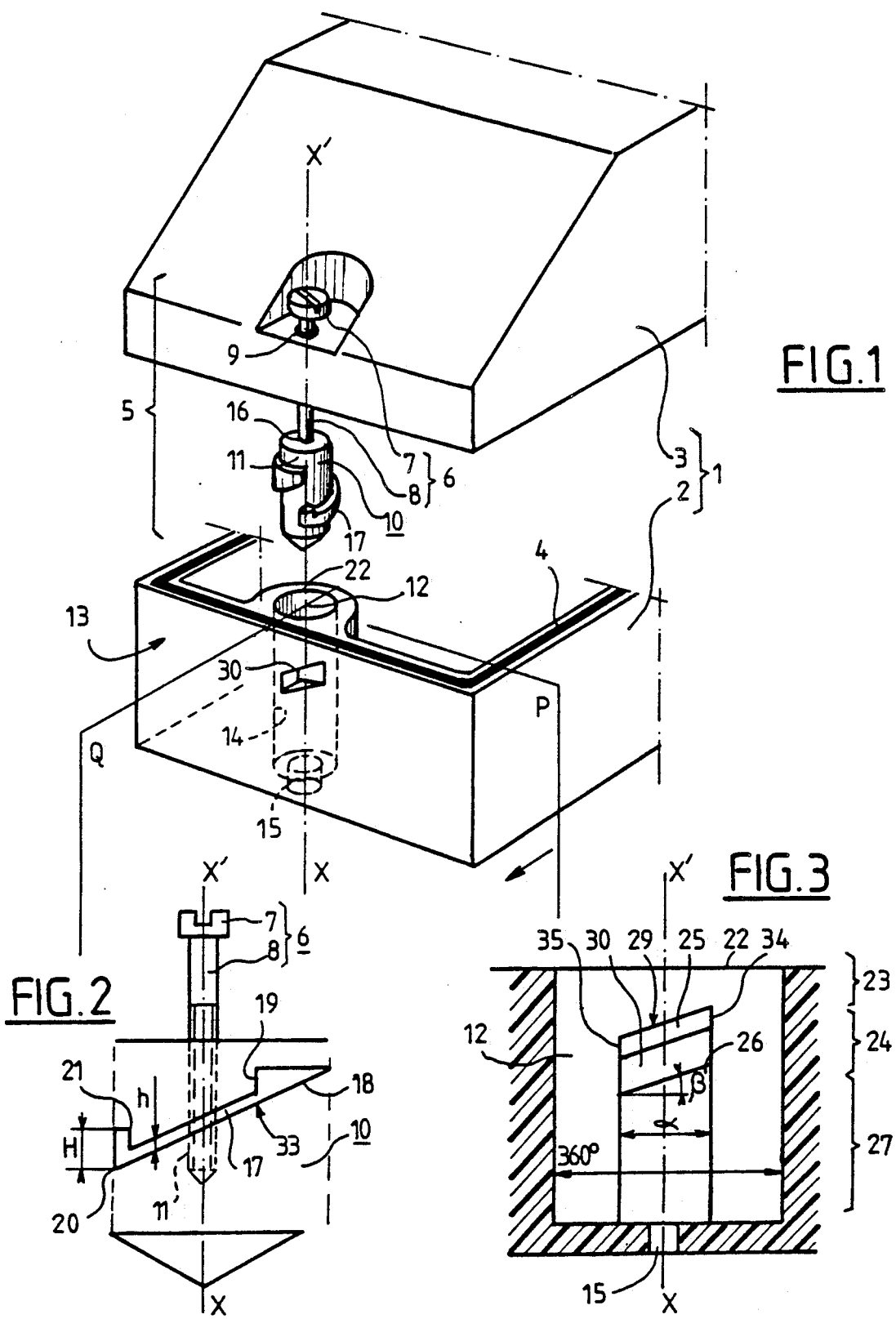

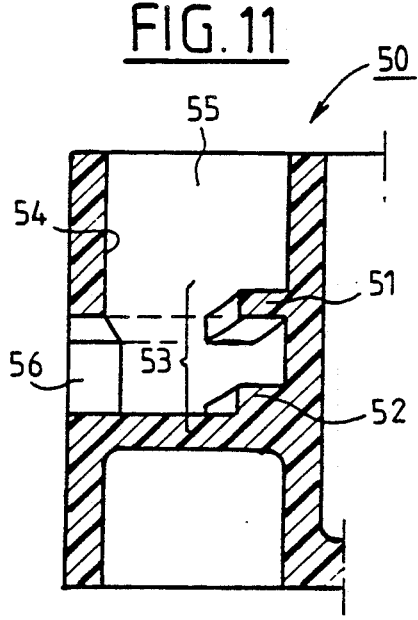
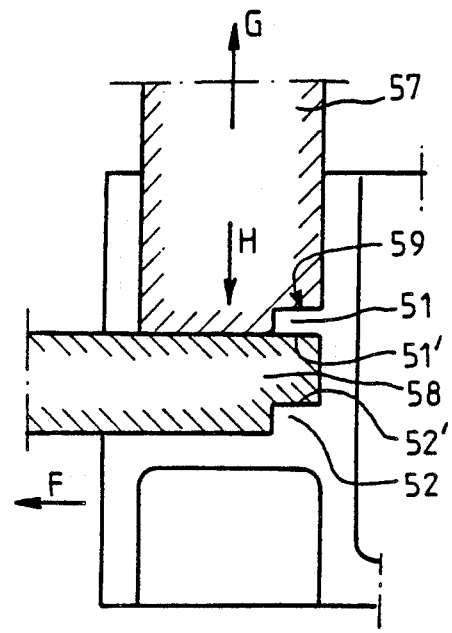
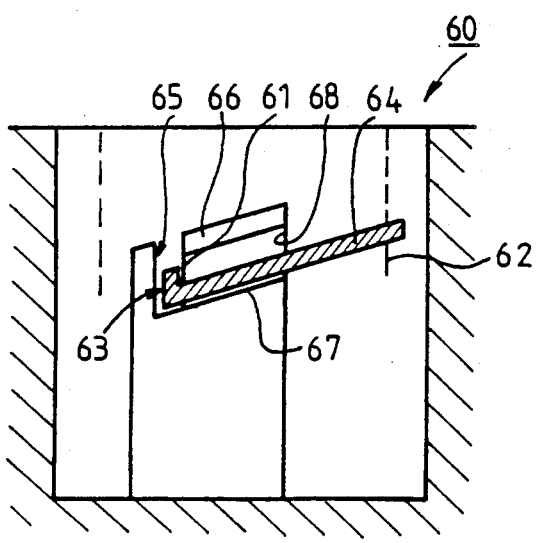
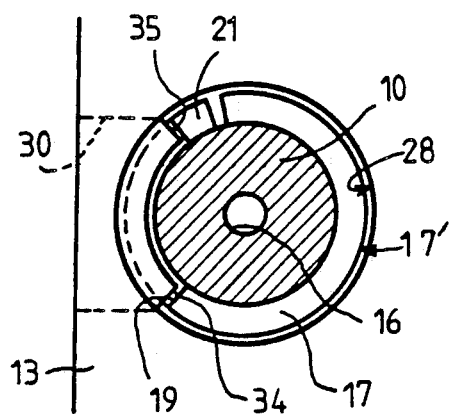

QUICK CLOSURE BOX

BACKGROUND OF THE INVENTION

The invention relates to a quick closure box comprising a molded material base and a lid fixed thereon by means of screws each passing through an opening in this lid and having a threaded end with a small diameter and small pitch which is engaged in a tapped hole belonging to a coaxial cylindrical extension having externally a large pitch thread of a diameter greater than the preceding one, this second thread being in its turn engaged in a second fixed tapped hole which is disposed in the base in the vicinity of a wall thereof.

Such boxes, which are in particular very widely used in electrical installations, receive in this case electric apparatus to be protected from the outside such, for example, as contact makers, contact breakers, thermal relays or any other accessory necessary for their connection which are fixed in the base, as well as possibly switches, change-over switches, indicator lights which are frequently fixed to the lid.

When the electric installations occupy a considerable volume because of the large number of electric apparatus which they use, the time required for positioning, connecting and closing the boxes occupies a considerable fraction of the tasks of the installing staff and, consequently, any technical means likely to shorten them is considered as a not inconsiderable intrinsic value of the equipment.

Arrangements have then been sought for appreciably reducing the time required for opening and closing the boxes using the means mentioned above. The arrangements already made further comply with two additional objectives which are, on the one hand, that of applying the lid with sufficient force to suitably compress the seal placed between the base and the lid and, on the other hand, that of using plastic material screw tappings which do not wear out during engagement with the metal threads which cooperate therewith.

A constant preoccupation in all industries is that of lowering the technical manufacturing costs which frequently involves simplifying the production means.

When tappings are formed on plastic material molded parts, the molds are generally equipped with threaded pins which can only be extracted, when their diameter is reduced, by rotating them.

The time devoted to such extraction represents a determining fraction of the total time required for opening the mold and any handling economy during this operation will constitute an appreciable gain in productivity. Furthermore, such rotary pins are substantially more costly and more subject to malfunctions than the slides which function with a simple rectilinear movement, for example transversely to the main removal direction.

Consequently, the invention proposes improving a quick closure box, whose general construction is that mentioned above in order to keep the advantages which are attached thereto, which improvements make possible not only improvement in productivity but also a great reduction of the time required for its opening and closure.

SUMMARY OF THE INVENTION

According to the invention, this object is attained because the second tapping is formed by a reduced number of angular fractions α of fixed longitudinally superimposed threads rooted in a smooth cylindrical hole, helical surfaces opposite these fractions being placed in alignment with a transversely opening wall opening and so that these helical surfaces receive a longitudinal support of the corresponding threads of the extension, whereas the external edge of these threads bears transversely on the cylindrical surface of the hole in a region opposite said angular fractions.

Arrangements are already known, particularly in plastic material sockets serving for receiving lighting lamp bases, which are closely related to the above mentioned measures if the function of the transverse studs of the bases is likened to that of a thread. Such likening however cannot be fundamentally established if we take into account the fact that the bayonet type engagement systems cannot be removed from the mold by means of a rotary pin and the nature of the functions fulfilled by such fixing means which, on the one hand, use a pair of symmetrical studs so as to confer a balance position on the base and where, on the other hand, the intensity of the forces used is out of proportion with that required when fixing a box lid sealingly on its base.

BRIEF DESCRIPTION OF THE DRAWINGS

The invention itself, as well as variants likely to reveal themselves necessary when the forces exerted on the thread of the base exceed a certain limit, or when adaptations of the arrangement are justified by the structure of the base, will be better understood from the following description, with reference to the accompanying drawings in which:

FIG. 1 is a local perspective view of means for quick fixing of a lid on a base;

FIGS. 2 and 3 are two developed views of a mobile thread and respectively of fixed threads belonging to the quick fixing means.

FIGS. 11 and 12 show two local sectional views through a plane similar to plane Q of FIG. 1, of a third embodiment of the invention and respectively of the parts of the mold used for its construction;

FIG. 13 is a developed view of a form which can be given to the mobile thread of the fixing means; and FIG. 14 is an axial view in partial section of the fixed and mobile elements of the fixing means when they are completely engaged.

DESCRIPTION OF THE PREFERRED EMBODIMENTS

Figure 4:
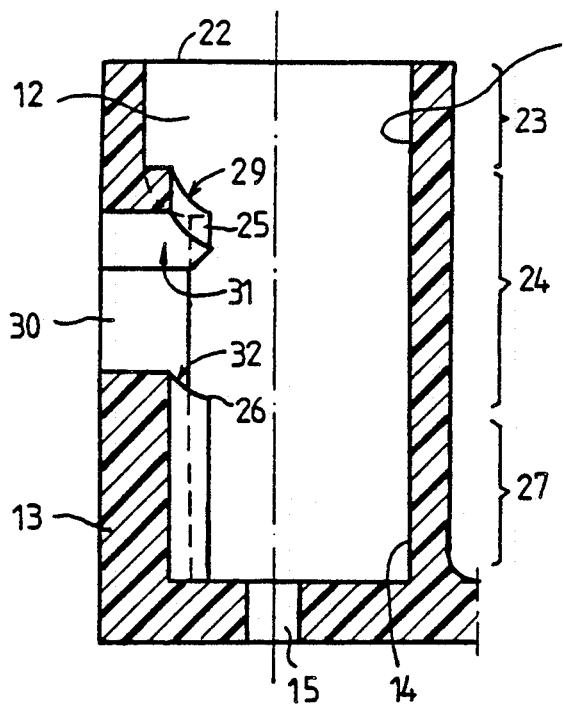
FIG. 4 is a partial sectional view through plane Q of FIG. 1 of the assemblies of clamping means placed in the base.

A quick closing and opening box 1, which is shown in FIG. 1, comprises a molded base 2 and a lid 3 which are associated sealingly along a plane through the presence of a seal such as 4, and screw clamping means with axis XX', such as shown at 5.

These means comprise a metal screw 6 with a head 7, a shank 8 passing through an opening 9 in the lid, a plastic extension 10 which is screwed concentrically on a threaded end 11 of the shank and is aligned with a coaxial cylindrical hole 12 carried by the base in the vicinity of a wall 13. Advantageously, the same hole may be extended by a well 14 whose bottom has an opening 15 for passage of a screw fixing the base on an appropriate support or board, not shown.

The rotary mobile extension 10 has, in the upper part, a fine pitch threaded hole 16 receiving the end 11 and, on its periphery, a large pitch thread 17 having a special configuration. This thread, which is best seen in FIG. 2 representing its development in a plane, has an end 18 oriented towards the head 7 side and comprises a longitudinal heel 19 whereas an opposite end 20 of this thread carries a longitudinal hook 21. The height -H- of this hook is consequently higher than the height -h- of the thread, these heights being measured in the longitudinal direction parallel to axis XX'.

The cylindrical hole 12, which is shown developed in FIG. 3 and in section in FIG. 4, comprises, from the opening 22, a first totally cylindrical region 23, a second region 24 equipped with angular fractions -α- of fixed superimposed threads 25, 26 and a third region 27 forming a well 14 already mentioned with a section which is not necessarily circular.

Figure 5:
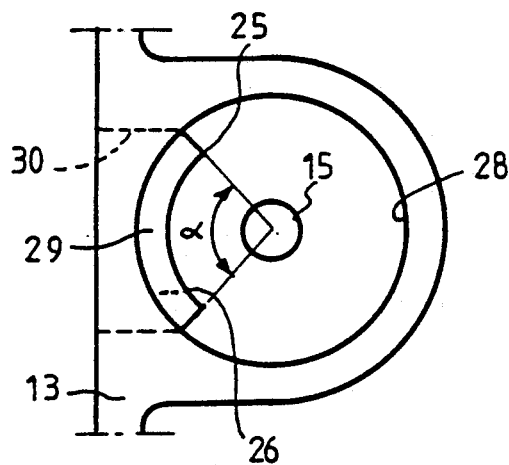
FIG. 5 is a top view of the elements of FIG. 4.

As can be seen in FIG. 5, the angular extent -α- of the thread portions 25, 26 remains less than 180°. FIG. 4 further shows the existence of an opening 30 which extends between hole 12 and the outside while passing between the two portions 25, 26.

Figure 6:
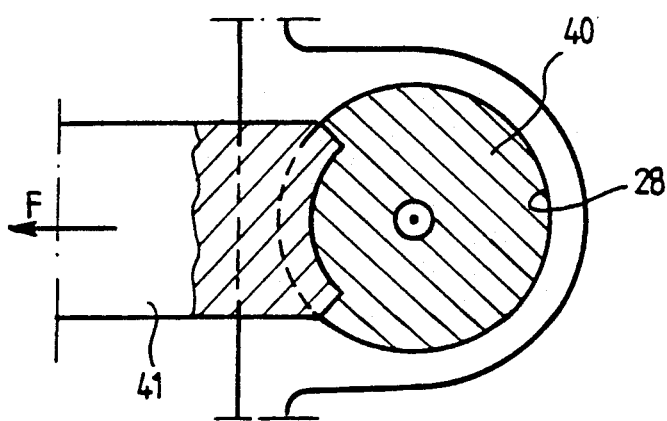
FIG. 6 is a simplified view of members disposed in a mold for forming the fixed threads.

The opposite surfaces 31, 32 of the latter, which could be defined by helicoids but may also be replaced by flat surfaces, are placed in alignment with opening 30 of which they may form extensions. This arrangement makes it possible, during the molding operation, to position a pin 40 for forming the regions 29, 23, 27, the top of thread 25, the opening 15, the cylindrical surface 28 opposite the one in which the threads are rooted and which can be removed from the mold without rotating, perpendicularly to the plane of FIG. 6, whereas the formation of surfaces 31, 32 is provided by a slide 41 which may be removed transversely from the mold in the direction of arrow F.

At the time of associating the lid with the base, extension 10 penetrates into a hole 12 and, because of the considerable slant of the threads 17 and 25 which come into contact, their natural tendency to be engaged is developed by the relative movement.

When the two parts of the box are applied one against the other, a rotational movement of appropriate direction must then be communicated to means 5 using a screwdriver engaged in head 7.

Figure 7:
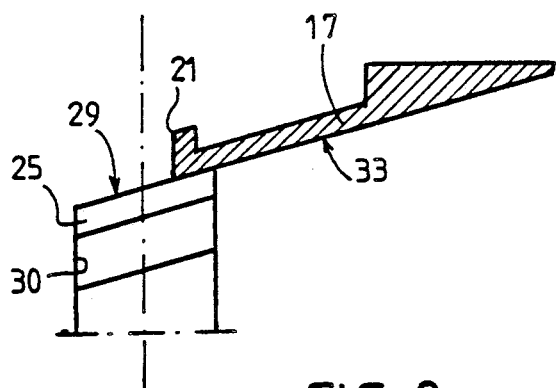
FIGS. 7, 8 and 9 show successive steps of engagement of the fixed threads and of the mobile thread of the fixing means.
Figure 8:
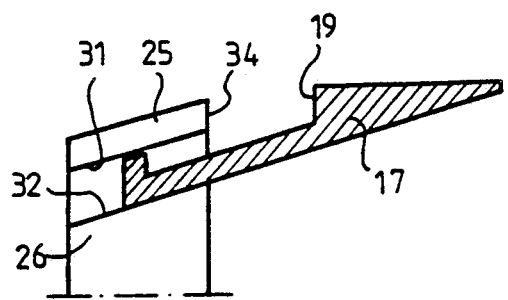

This movement causes the surface 33 of thread 17 (FIG. 7) to slide against the surface 29 of the first fixed thread 25; the helical movement thus created then progressively brings thread 17 between threads 25 and 26 until heel 19 meets the beginning 34 of thread 25 placed close to the inlet 22; in this position, for which no additional rotation of extension 10 is possible, further screwing of head 7 causes the threaded end 11 to penetrate into the threaded hole 16 and so a movement in direction G of the extension. This movement -G- brings the hook 21, which was then angularly beyond the endmost end 35 of thread 25, behind this end so that the tendency to natural unscrewing, because of the considerable helix angles -α-, is totally eliminated (see FIGS. 7, 8, 9 and 14).

Finally, in this position of complete clamping, the edge 17' of the mobile thread 17 bears against the cylindrical surface 28 which is opposite the one receiving the thread portions 25, 26.

The unscrewing operation begins by previously unscrewing end 11 from the threaded hole 16, which causes a movement of hook 21 in the direction opposite G until the hook escapes from the end 35 of the thread; the extension is then in a condition to be able to slide while rotating and to rise in direction G because of the presence of the smooth part of the screw shank 8 which itself passes freely through the hole 9 in lid 3.

Figure 10:
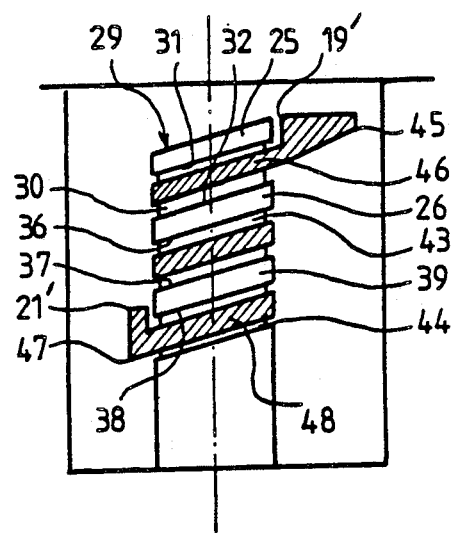
FIG. 10 shows a second embodiment of the fixing means of the invention.
Figure 9:
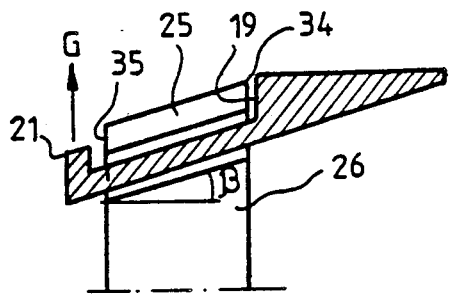

Modifications such as 49 (see FIG. 10) may be made to the embodiment of the invention which has just been described.

Thus, if the intensity of the forces for clamping the lid made it necessary, several additional superimposed thread portions 25, 26, 39 could be disposed in a cylindrical hole 12'. In this case, the formation of the active fixed thread surfaces, such as 31, 32, 36, 37, 38 would require the presence of lateral openings such as 30, 43, 44; it is clear that in this case a molded material extension 10' longer than the preceding one would comprise a greater number of mobile threads for engagement with the fixed threads. As in the first embodiment, a heel 19' and a hook 21' would be disposed at the beginning 45 of the first thread 46 and respectively at the end 47 of the last thread 48.

Finally, it should be noted that if, in the two above described examples, the large pitch fixed threads are rooted in a cylindrical surface portion close to the outside wall 13 of the base in order to allow pin 40 to penetrate to the bottom of well 14, in a different arrangement the fixed threads may be displaced when hole 12 is not to be as deep.

In this case 50 (see FIG. 11) fixed thread portions 51, 52 would be disposed on portion 53 of the cylindrical surface 54 of hole 55 situated opposite the opening 56; as can be seen in FIG. 12, a pin 57 of the mold would then bear longitudinally in direction H on a slide 58, which is movable transversely in direction F, so as to form only the upper cylindrical portion of the hole and the upper surface 59 of the first thread 51, surfaces 51', 52' being here again formed by slide 58 passing through opening 56.

A modified form 60 of the means for limiting the rotation of extension 62 (see FIG. 13) may finally be provided, in which a longitudinal surface 63, placed on the end hook 61 of mobile thread 64, would bear on an abutment surface 65 placed in the lower extension of the fixed threads 66, 67 to play a role comparable to that of the heel used in the preceding embodiments. The abutment surface 65 could be formed either by a pin alone or in combination with a slide then requiring an opening 68 which is wider than that 56 illustrated in FIG. 11.

What is claimed is

1. Quick closure box comprising a molded material base and a lid fixed thereon by means of screws each passing through an opening in this lid and having a threaded end with a small diameter and small pitch which is engaged in a tapped hole belonging to a coaxial cylindrical extension having externally a large pitch thread of a diameter greater than the preceding one, this second thread being in its turn engaged in a second fixed tapped hole which is disposed in the base in the vicinity of a wall thereof, wherein said second tapping is formed by a reduced number of angular fractions -α- of fixed longitudinally superimposed threads rooted in a smooth cylindrical hole, helical surfaces opposite these fractions being placed in alignment with a transversely opening wall opening and so that these helical surfaces receive a longitudinal support of the corresponding threads of the extension, whereas the external edge of these threads bears transversely on the cylindrical surface of the hole in a region opposite said angular fractions.

2. The box as claimed in claim 1, wherein the angular fraction -α- of the fixed threads is less than 180°, these fractions being at least two in number.

3. The box as claimed in claim 1, wherein the extension is equipped with a continuous mobile thread, one end of which directed towards the head of the screw has a heel, abutting on a beginning of the first fixed thread directed towards the inlet of the cylindrical hole.

4. The box as claimed in claim 1, wherein said extension is equipped with a continuous mobile thread, one end of which opposite the head of the screw has a hook adapted for cooperating with the end of a last fixed thread by a longitudinal movement effected in direction G, during clamping, the height of this mobile thread being longitudinally less than the height of this hook.

5. The box as claimed in claim 1, wherein said external opening passes through a partition of the base which is either close to or opposite said cylindrical surface region.

* * * * *